Feb. 23, 1932.  E. W. BOWKER  1,846,083
AUTOMATIC CONVEYER CONTROL
Filed Jan. 29, 1931  4 Sheets-Sheet 1
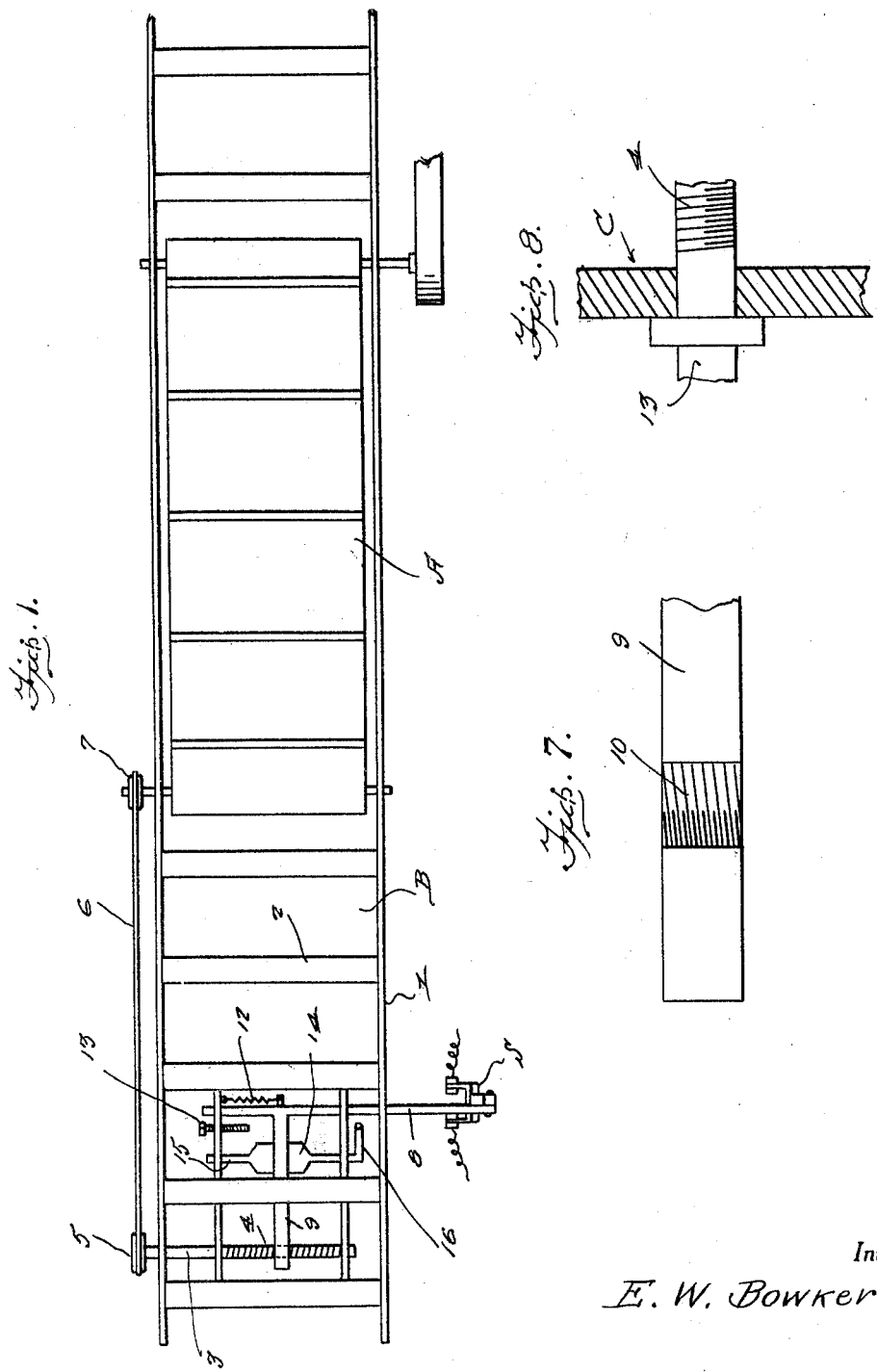
Inventor
E. W. Bowker
By Clarence A. O'Brien
Attorney

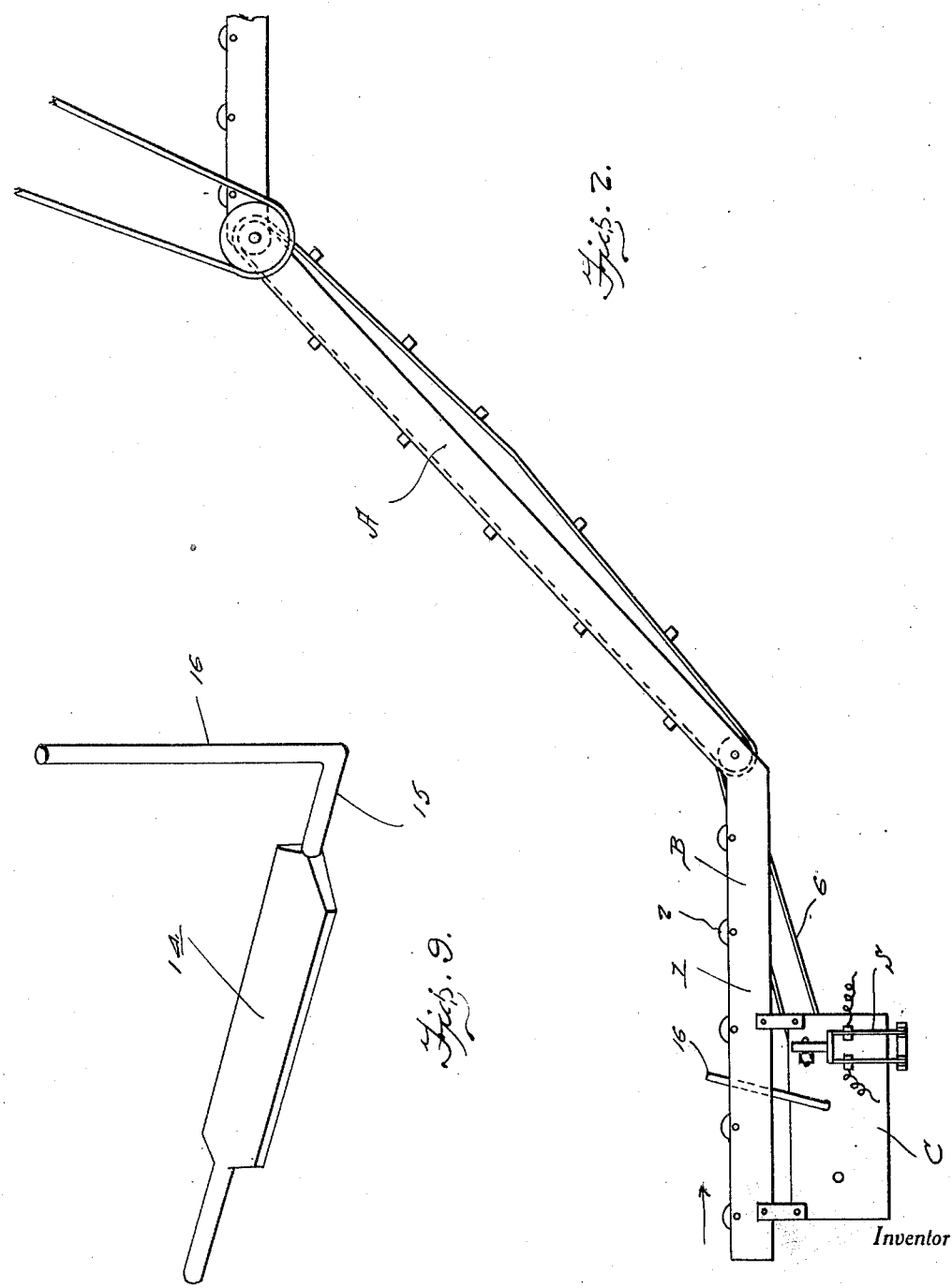

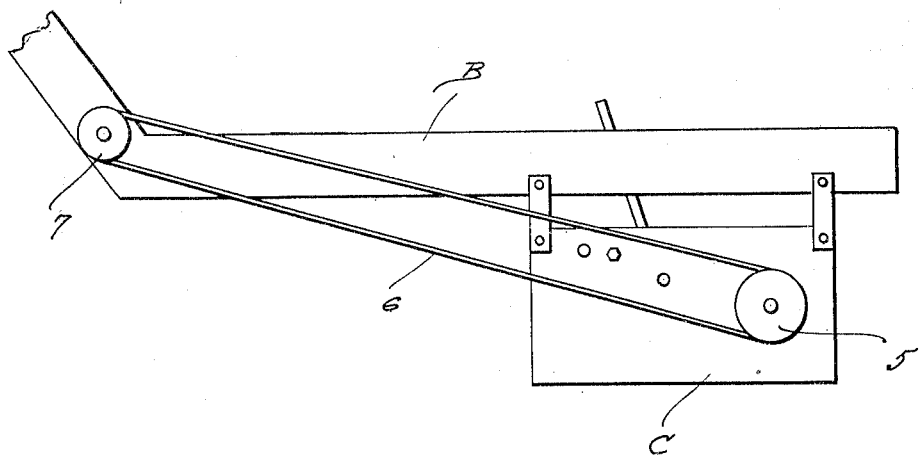
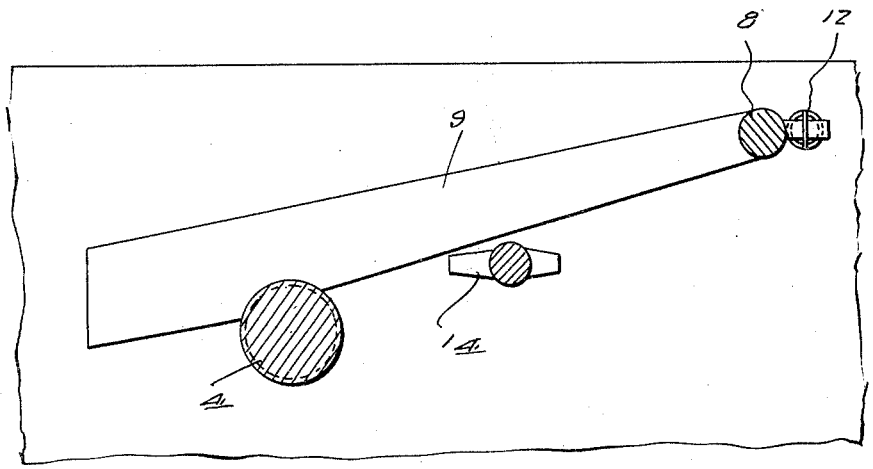

Inventor
E. W. Bowker
By Clarence A. O'Brien
Attorney

Patented Feb. 23, 1932

1,846,083

UNITED STATES PATENT OFFICE

EUGENE W. BOWKER, OF CORTLAND, NEW YORK

AUTOMATIC CONVEYER CONTROL

Application filed January 29, 1931. Serial No. 512,138.

This invention relates to automatic conveyor controls, the general object of the invention being to provide automatic means for starting the conveyor in operation by an article or articles moving over the approach to the conveyor, such means also acting to stop the conveyor after the last article has been moved by the conveyor and no other articles are passing over the approach to the conveyor.

Another object of the invention is to provide adjustable means for regulating the operation of the conveyor after the last article has passed thereon so that the conveyor will continue to operate until such article has entirely moved over the conveyor.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of conveyor means showing the invention in use.

Figure 2 is a side view of Figure 1.

Figure 3 is a view looking toward the opposite side from that shown in Figure 2 and showing part of the conveying means.

Figure 6 is a section on line 6—6 of Figure 4.

Figure 7 is a fragmentary view showing the lower edge of the screw shaft engaging member.

Figure 8 is a detail view showing part of the screw shaft journalled in a part of the supporting frame.

Figure 9 is a view of the member which is operated by the article passing over the approach to the conveyor.

Figure 4:
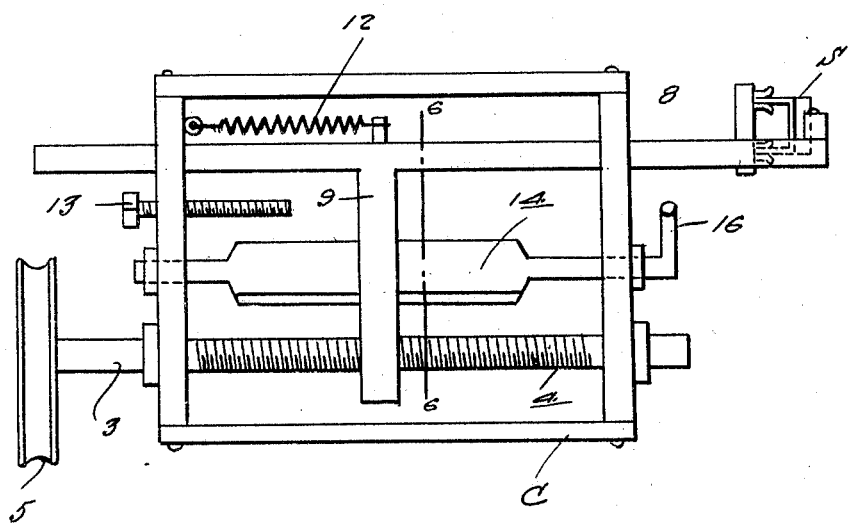
Figure 4 is a top plan view showing the parts of the invention.
Figure 5:
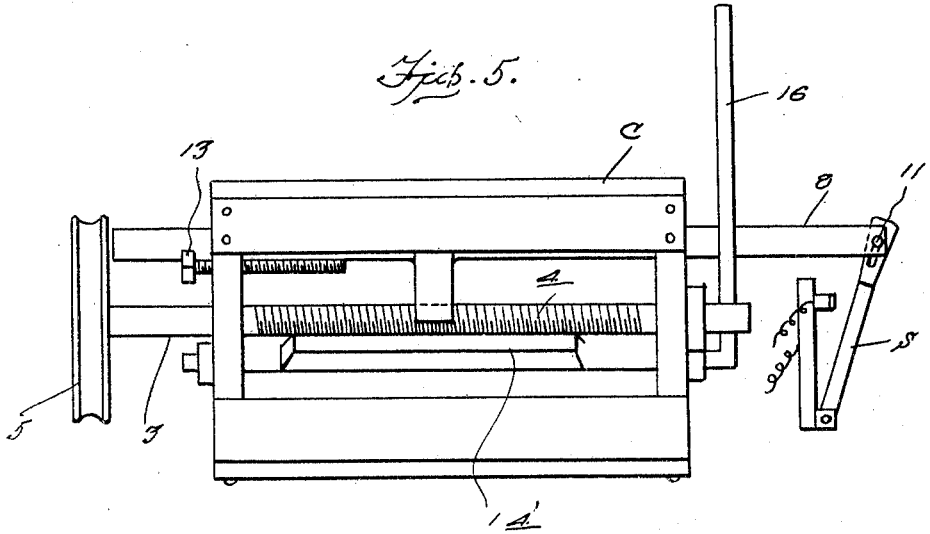
Figure 5 is an end view.

In these drawings, the letter A indicates the conveyor and the letter B indicates the approach to the conveyor which is formed of a frame 1 and the rollers 2 so that articles can be pushed over the rollers to a point where they will be engaged by the endless member of the conveyor so that the conveyor will move the articles to the delivery point.

In carrying out my invention I locate a frame C under the front part of the approach B and this frame has journalled therein a transverse shaft 3 which is threaded as shown at 4, and which has at one end a pulley 5 over which the belt 6 passes, the belt being connected to a pulley 7 which is carried by one of the conveyor rollers so that the shaft 3 is rotated from the conveying means. A bar 8 is slidably arranged in the end pieces of the frame C and has a right angle extension or arm 9 connected with the intermediate part, the lower edge of this arm having a threaded semi-circular recess 10 therein for receiving a part of the threaded portion of the shaft so that when this part 10 of the arm contacts with the shaft, and the shaft is rotated the arm 9 and the bar 8 will be moved longitudinally so as to open the switch S to the arm of which the outer end of the bar 8 is connected as shown at 11. A spring 12 tends to hold the bar 8 with the arm 9 in engagement with an adjustable bolt 13 which passes through a threaded hole in one of the end pieces of the frame. A flat plate like member 14 has trunnions 15 at its ends which are journalled in the ends of the frame C, one trunnion is bent to form an arm 16 which extends upwardly between a pair of the rollers 2 of the part B of the conveying means so that this arm will be engaged by articles passing over the said portion B. The flat part 14 is so formed that it will normally occupy a horizontal position or substantially so with the arm 16 extending upwardly as shown. However, an article passing over the part B will engage the arm and thus rock the same so as to tilt the flat part of member 14 which is located under the arm 9. Thus this tilted movement of the member 14 will raise the arm 9, the bar 8 rocking in the end pieces of the frame so that the threaded recess 10 in the arm 9 is moved out of engagement with the screw shaft 4 which permits the spring 12 to move the arm 9 and rod 8 against the inner end of the adjusting bolt 13.

This inward movement of the bar 8 will close the switch S and thus the circuit of the motor which drives the conveying means is closed and the motor begins to operate the conveyor. Thus the conveyor picks up the articles from the portion B. As long as articles are passed over the approach B, the member 14 will remain in tilted position with the arm 9 in raised position above the screw shaft but when the last article passes over the part B, the member 14 will assume its horizontal position so that the arm 9 will drop upon the screw shaft and thus the shaft engaging the threaded recess 10 will cause the arm 9 and the rod 8 to move outwardly against the action of the spring 12 until the switch S is open and thus the circuit to the actuating means of the conveyor is broken and the conveyor comes to rest.

It will of course be understood that the adjustment screw 13 should be so set as to permit the arm 9 and the rod 8 to have sufficient movement before opening the switch to permit the conveyor to operate long enough to move the last article from the approach B to the delivery point.

From the foregoing, it will be seen that I have provided simple means whereby a conveyor is only operated when articles are being moved thereby, the conveyor automatically being stopped after the last article has been moved thereby. As soon as other articles are placed on the approach B, the conveyor will start up again to move such articles.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:

1. In combination with a conveyor and its approach, a support located adjacent the approach, a member slidably and rockably supported in the support, an arm on said member, said arm having a threaded semi-circular recess, a screw shaft journalled in the support and driven from a part of the conveyor, and with which the recess engages whereby the arm and sliding member is moved by the rotation of the shaft, a member supported for rocking movement in the support, and having an upstanding arm thereon extending into the path of articles moving over the approach whereby said member will be rocked by an article engaging the arm and said member will lift the recessed arm out of engagement with the shaft, means connected with the slidable member for normally holding the same in a certain position, means for starting the conveyor into operation when said sliding member is in a certain other position.

2. In combination with a conveyor and its approach, a supporting frame suspended from the approach, a member having a flat part supported for rocking movement in said frame, an upstanding arm on the said member extending into the path of articles moving over the approach, said member normally occupying a horizontal position but moving to a substantially vertical position when an article strikes the arm, a bar supported for sliding and rocking movement in the frame, a switch for controlling the drive means of the conveyor to which said rod is connected, means for normally holding the rod in position with the switch closed, an arm on the bar extending over the flat member and having a threaded semi-circular recess therein, a screw shaft journalled in the frame and with which the threads of the recess engage when the arm rests thereon, said arm being raised above the shaft by the flat member when its arm is struck by an article, means for rotating the shaft from a part of the conveyor, and an adjustable stop in the frame against which the recessed arm engages when the parts are in switch closing position.

3. In combination with a conveyor and its approach, a movable member, yieldable means for normally holding said member in a certain position, means for starting the conveyor in the operation when said movable member is in said position, means operated from the conveyor for moving said member against the action of the yieldable means, a rockable member having an upstanding arm extending into the path of articles moving over the approach, whereby said member will be rocked by an article engaging the arm and means actuated by the rocking of said rockable member for moving the movable member out of engagement with the operating means therefor whereby the yieldable means will return the movable member to normal position.

In testimony whereof I affix my signature.

EUGENE W. BOWKER.